UNITED STATES PATENT OFFICE.

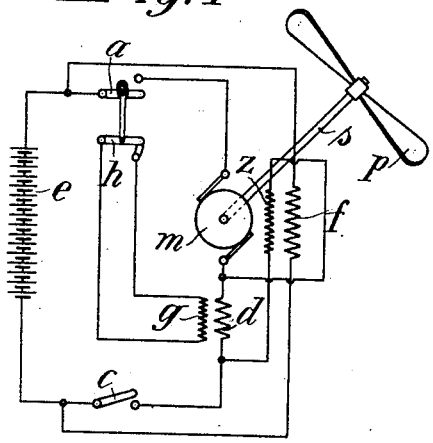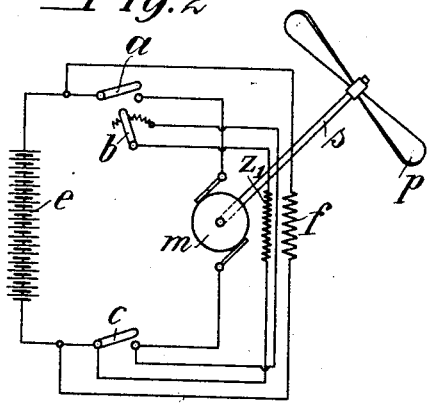

CARL TRETTIN, OF BERLIN, GERMANY, ASSIGNOR TO SIEMENS-SCHUCKERT WERKE, G. M. B. H., OF BERLIN, GERMANY, A CORPORATION OF GERMANY.

ELECTRIC-MOTOR SYSTEM.

1,310,458.     Specification of Letters Patent.     Patented July 22, 1919.

Application filed June 5, 1913, Serial No. 771,964. Renewed December 11, 1918. Serial No. 266,366.

*To all whom it may concern:*

Be it known that I, CARL TRETTIN, a citizen of the German Empire, and residing at Berlin, Germany, have invented certain new and useful Improvements in Electric-Motor Systems, of which the following is a specification.

My invention relates to a novel electric motor system and especially to a system of this kind for driving propellers of air or water vehicles such as aeroplanes, airships, submarine boats or torpedo-boats. In such a system the load increases about as the square of the propeller or motor speed, that is to say, at starting the load is extremely small, while it increases far more rapidly than the motor or propeller speed until it reaches—for instance in the case of a propeller in water—its maximum at a definite speed, which is dependent upon the particular construction of the propeller. Motor-systems having such load characteristics may therefore be termed "systems having a load which is increasing more rapidly than the speed" and I have used this term in the claims for the purpose of defining such motor systems; it must be understood, however, that I do not wish to confine my invention to systems of this kind.

The primary object of my present invention is to devise a motor-system which is particularly adapted to the above conditions; in addition to this my invention is especially designed to do away with the ordinarily employed starting resistances, which have been found extremely undesirable for this kind of motor systems not only on account of their weight or the space required, but also of the difficulties which are encountered in disposing of the heat of such resistances.

Before describing the apparatus in detail I wish to point out some peculiar conditions which are found in driving systems for propellers or loads of similar characteristics. The fact above stated that the load in propeller systems increases about with the square of the speed must be understood to be true only for normal acceleration of the propeller, while for overnormal or excessive acceleration the load characteristics of propellers do no longer follow this law; at normal acceleration the propeller will allow the liquid to slide along the oblique surfaces of the propeller and to properly exert an axial propelling force according to this law, much the same as at normal and constant propeller speeds. At overnormal acceleration, however, there will no longer exist the proper relative motion between the liquid and the propeller as eddies will be caused in the liquid resulting in an axial propelling force or load which is considerably smaller than that following from said law at normal acceleration. This fact, now, is taken advantage of in my present invention, in that I cause an overnormal acceleration of the propeller and therewith a relatively light load during the starting or accelerating period, thus dispensing with the commonly employed starting resistances, while during the normal operating period the proper relative motion between propeller and liquid will take place and this normal load may then easily be taken up by the motor, when up to speed.

My invention will be more fully understood by reference to the accompanying drawing of which Figure 1 shows a diagrammatic view of the motor, the regulating means and the current source, and Fig. 2 a modification of the arrangement presented in Fig. 1.

Referring now more particularly to Fig. 1 I have shown a battery $e$ which may be connected by means of the single-pole single-throw switches $a$ and $c$ to the armature terminals (brushes) of an electric motor $m$. Inserted in this circuit is a choke coil $d$, the particular function of which will be pointed out later; $f$ is the field winding which is connected with the current source in parallel with the armature of the motor $m$. An auxiliary or additional winding $z$ is provided upon the field structure, and is connected in parallel to the choke coil $d$ namely to the terminals of this choke coil. In order to incorporate the particular load characteristics as above pointed out, in the drawing, I have shown a propeller $p$ which is coupled to the motor $m$ by the shaft $s$.

The operation of the motor $m$ and the function of the several regulating means of the scheme represented in Fig. 1 is now as follows: For starting, the switches $a$ and $c$ are closed, which will cause a current to flow in the armature circuit into which also the choke coil is inserted and in the winding $z$ which is connected in shunt with the choke coil $d$. The presence of the choke coil in the armature circuit will momentarily cause an excess of current in the auxiliary exciter-winding $z$, resulting in an excess of field strength at the moment of starting, while after the stationary conditions of current-flow have taken place, the current in the winding $z$ and therewith the field strength of the motor will be diminished, the current in the winding $z$ being now apparently determined by the ohmic resistances of the choke coil $d$ and the winding $z$. As regards the design of the choke coil $d$ and the winding $z$ it may be noted that a sufficient compounding should be obtained during the operating condition of the motor.

In the arrangement of Fig. 1 I have further provided a means for preventing the rise of an excessive voltage, which owing to the self-induction of the choke-coil may be produced by the opening of the armature circuit. For this purpose I employ a secondary winding $g$ in inductive or transformer relation to the choke coil $d$, said winding $g$ being shortcircuited by the switch $h$ in or approximately in the moment when the armature circuit is opened and which may be opened when the armature circuit is closed. For conveniently operating this switch $h$ in this manner various schemes may be employed. For the sake of simplicity I have shown a simple mechanical connection between the switches $a$ and $h$, which, as clearly shown in the drawing, will accomplish the desired result.

Fig. 2, in which similar letters designate similar devices of Fig. 1, shows a modification of the arrangement of Fig. 1, in that the momentary increase of the field strength at starting instead of being purely automatic by action of the choking effect of the coil $d$, is effected by an auxiliary exciter winding $z_1$ which may be inserted in series with the armature circuit by opening the switch $c$, and regulated by the regulating resistances $b$, which are also inserted in series with said winding $z_1$.

For starting the motor of Fig. 2 switch $a$ is closed before the closing of switch $c$, which at the moment of starting will cause the winding $z_1$ to be excited, thus developing a strong field in the motor, while the armature-current, owing to the resistance of the winding will be kept at a relatively low value. Thereupon switch $c$ is closed, whereby the full battery voltage will be impressed upon the armature winding. The winding $z_1$ now although shortcircuited and disconnected from the current source will yet retain its field for some time which is due to the self-induction of this winding; more particularly the excess of field strength caused by the winding $z_1$ as well as winding $z$ will be retained for a longer time than will be required for the armature current to reach its maximum value, which may well be accomplished by proper design. The motor therefore will start with a strong field, the same as in the case shown in Fig. 1. By means of the regulating resistances $b$ which are provided in circuit with the winding $z$, it will furthermore be possible to regulate the field strength produced by the winding $z_1$ and especially to cut out entirely the effect of this additional winding at desired times, for instance during interruption of the motor-service.

As regards the specific modes of exciting the winding $z$ or $z_1$, as shown in Figs. 1 and 2 respectively, I wish it to be understood that I do not limit myself to the arrangements shown and described, but I wish to claim all modifications by which an excess of excitation in the motor field is produced at starting, and this excess of excitation maintained until after the full operating voltage is impressed upon the armature.

Having thus described my invention, I do not wish to be understood as limiting myself to the precise arrangements as shown and described, since many modifications may be made thereon without departing from the spirit or sacrificing any of the advantages of this invention, but

I claim:—

1. A work system of the character described, comprising in combination a motor having a constantly excited field winding, a work member whose load increases at a greater rate than the speed, suitably connected with said motor, means for temporarily increasing the field strength of the motor at the moment of starting, and means for connecting said motor directly with a current source.

2. A work system comprising in combination an electric motor, a work member having a load which is increasing more rapidly than the speed, a constantly excited field winding on the motor, a choke coil inserted in the armature circuit of the motor of said system, an auxiliary field winding for the motor, said auxiliary field winding being connected in parallel with said choke coil, said choke coil and said auxiliary field winding being so designed that the effect of said winding at starting will be maintained until after the armature current of said motor has reached its maximum value.

3. In combination with an electric motor system having a load which is increasing more rapidly than the speed, a constantly excited field winding on the motor, a choke coil in a motor circuit, means for opening and closing the circuit, a secondary or damping winding in inductive relation to said choke coil, and means for opening and closing said winding about simultaneously with the closing and opening of said circuit respectively.

In testimony whereof I have signed my name to this specification in the presence of two witnesses.

CARL TRETTIN.

Witnesses:
 HENRY HASPER,
 WOLDEMAR HAUPT.

Copies of this patent may be obtained for five cents each, by addressing the "Commissioner of Patents. Washington, D. C."